United States Patent [19]

Kovacs

[11] 4,202,125
[45] May 13, 1980

[54] FISHING ROD HOLDER WITH SIGNAL MEANS

[76] Inventor: Donald J. Kovacs, 366 N. Huron Dr., Au Gres, Mich. 48703

[21] Appl. No.: 934,209

[22] Filed: Aug. 16, 1978

[51] Int. Cl.² ............................................. A01K 97/12
[52] U.S. Cl. .......................................... 43/17; 43/21.2
[58] Field of Search ................... 43/16, 17, 17.5, 21.2, 43/15

[56] References Cited

U.S. PATENT DOCUMENTS

| | | | |
|---|---|---|---|
| 2,627,690 | 2/1953 | Kniffer | 43/17 |
| 3,560,969 | 2/1971 | Fleeman | 43/17 X |
| 3,646,697 | 3/1972 | Jennings | 43/17 |
| 3,707,801 | 1/1973 | Gednalske | 43/17 |
| 3,713,131 | 1/1973 | Marshall | 43/17 |
| 3,874,107 | 4/1975 | Wheaton | 43/17 |
| 3,903,633 | 9/1975 | Hutcherson | 43/17 |
| 4,092,795 | 6/1978 | Bryant | 43/17 |

Primary Examiner—Othell M. Simpson
Assistant Examiner—Robert P. Olszewski
Attorney, Agent, or Firm—Barnes, Kisselle, Raisch & Choate

[57] ABSTRACT

A fishing rod holder comprising a bracket and a rod holding member pivoted on the bracket for movement about a generally horizontal axis. A pair of spaced electrical contacts are provided on the rod holding member and a tensioning arm forms a third contact adapted to be normally engaged by the rod holding member at a point intermediate the spaced first and second contacts. The tensioning arm is yieldingly mounted on the bracket and is connected electrically to a signal device which in turn is connected to the pair of contacts such that when the rod holding member is moved in one direction or another relative to the bracket, a predetermined distance, a circuit is completed through the tensioning arm to energize the signal means.

16 Claims, 8 Drawing Figures

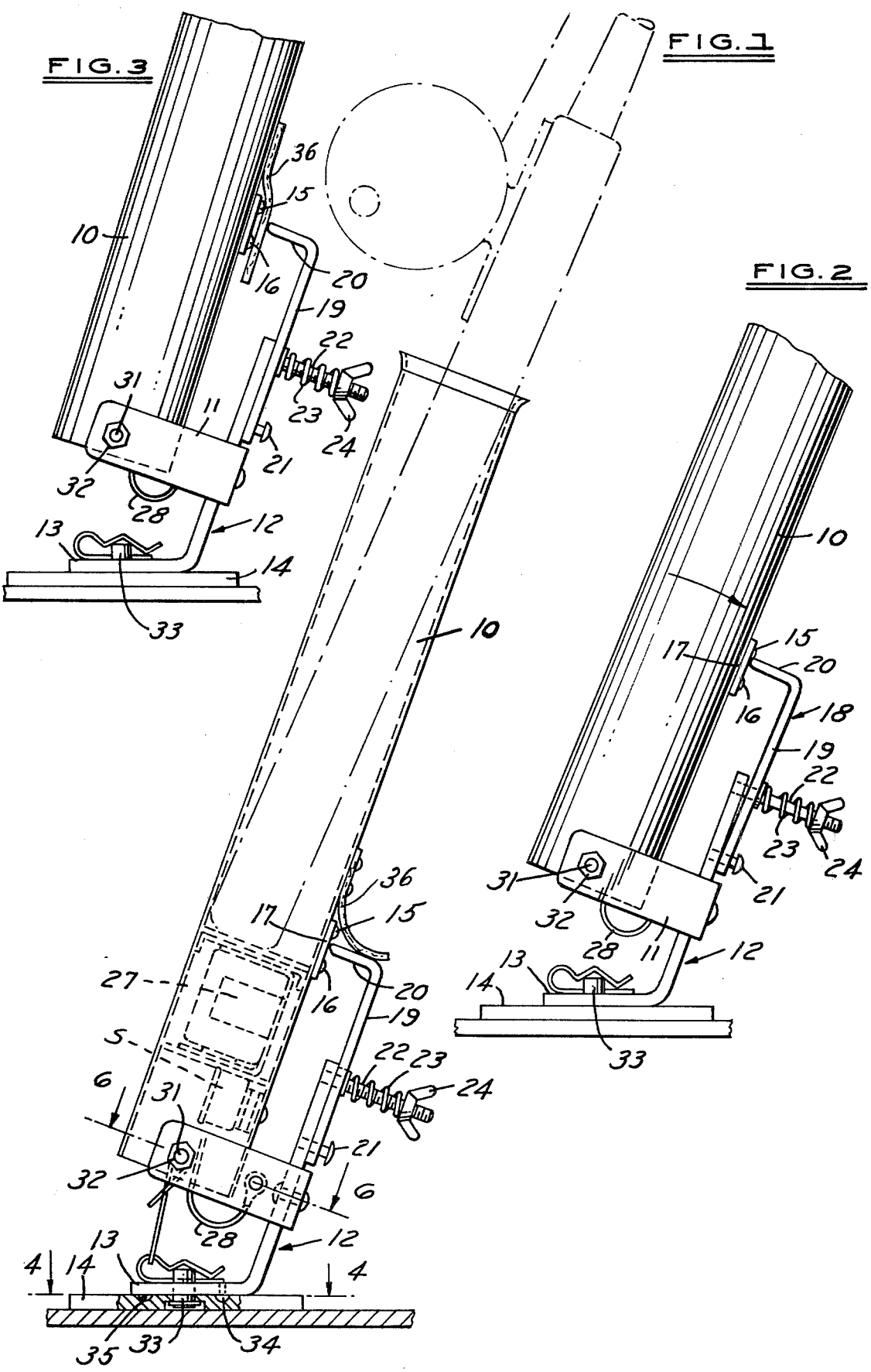

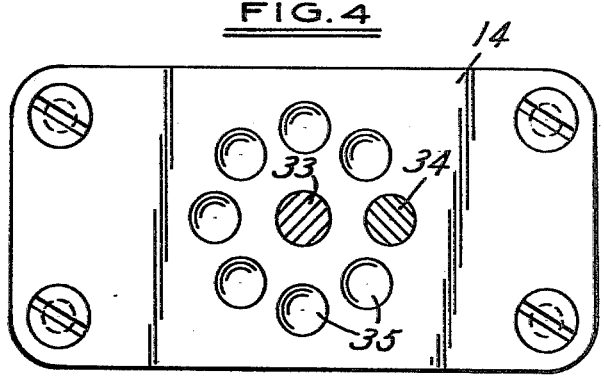
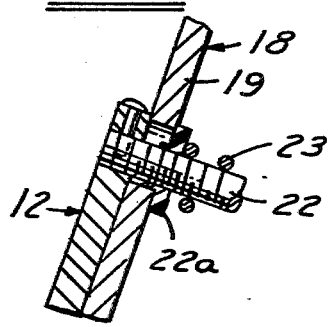
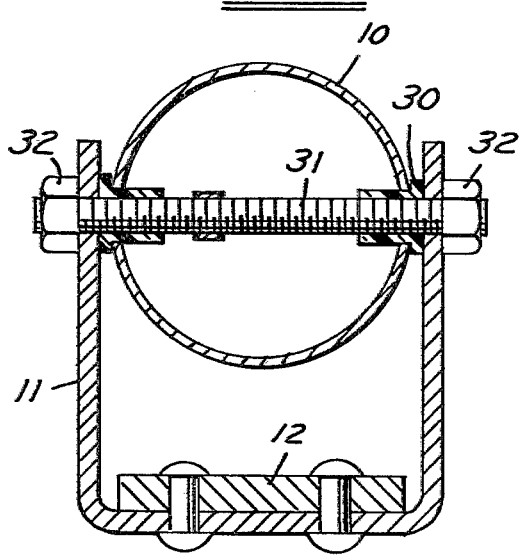
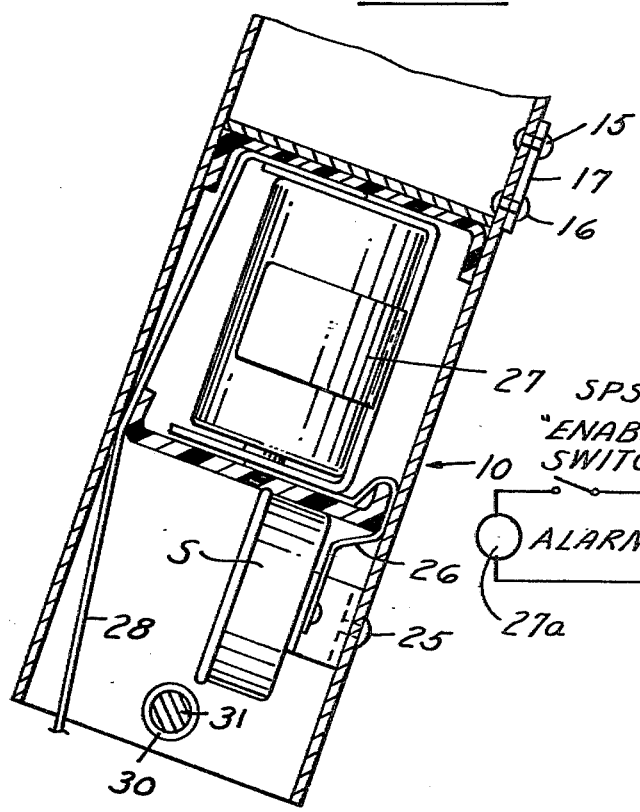
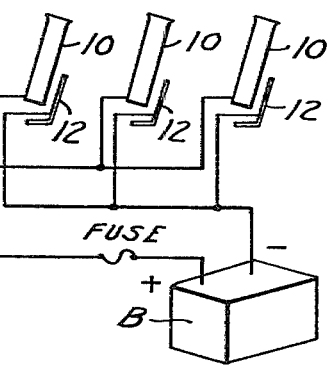

FISHING ROD HOLDER WITH SIGNAL MEANS

This invention relates to fishing rod holders and particularly to such rod holders incorporating a device for sensing and indicating the presence of fish on rod and reel fishing tackle held in position by the fishing rod holder.

It has heretofore been suggested that signaling devices be provided on fishing rod holders for sensing and indicating the presence of fish on the rod and reel fishing tackle. Such devices conventionally utilize spaced contacts, one on the holding device and the other on the bracket or base that supports the holding device so that when there is relative movement caused by tensioning of the fishing line, a circuit is completed through the two contacts. One of the problems with such a device is that the presence of a fish may not only cause tensioning of the fishing line as in the case of trolling or still fishing but may also cause the fishing line to relax as in the case of downrigger fishing.

Accordingly, the present invention is directed to a device which is operable to sense the presence of fish whenever the tension on the fishing line varies either by increasing or decreasing a predetermined amount which can be varied. Further, in accordance with the invention, means is provided for preventing inadvertent signal when it is not desired.

In accordance with the invention, the objective of sensing predetermined variations in tension is achieved by providing a pair of spaced contacts on the rod holding device which are engaged by a resilient contact arm on the bracket or base, one contact being engaged when the tension on the line is increased and the other being engaged when the tension on the line is decreased thereby establishing a circuit to the signal means. Inadvertent electrical energization of the signal means is obviated by interposition of a nonconducting element on the rod holder between the pair of contacts and the contact arm.

DESCRIPTION OF THE DRAWINGS

FIG. 1 is a part sectional side elevational view of a fishing rod holding device embodying the invention.

FIG. 2 is a fragmentary view similar to FIG. 1 showing parts in a different operative position.

FIG. 3 is a fragmentary view similar to FIG. 1 showing the parts in inoperative position.

FIG. 4 is a fragmentary sectional view taken along the line 4—4 in FIG. 1.

FIG. 5 is a fragmentary sectional view on an enlarged scale of a portion of the apparatus.

FIG. 6 is a fragmentary sectional view taken along the line 6—6 in FIG. 1.

FIG. 7 is a vertical sectional view through a portion of the device.

FIG. 8 is a schematic wiring diagram of a modified system embodying a plurality of fishing rod holding devices.

DESCRIPTION

Referring to FIGS. 1-3, the fishing rod holder embodying the invention comprises a tubular fishing rod holder 10 made of light weight material such as aluminum that is pivotally mounted as presently described about a generally horizontal axis on a yoke 11 fastened to the upper end of a bracket 12. The bracket 12 has a horizontal portion 13 which is adjustably mounted about a horizontal axis on a base plate 14, as presently described.

First and second spaced electrical contacts 15,16 are mounted on the holder 10 and extend through an insulating spacer 17 mounted on holder 10 by rivets. A contact arm 18 having a vertical portion 19 and a right angle portion 20 is mounted on the upstanding portion of the bracket 12 by a rivet 21 and threaded shaft 22 extending respectively through spaced openings in the portion 19 of the arm 18. Shaft 22 extends through a bushing 22a. A spring 23 is interposed between the portion 19 and a wing nut 24 to yeildingly urge the contact arm 18 toward the bracket and in turn toward the rod holder 10. An electrical circuit is provided by contacts 15,16 through conductive holder 10 to signal device S which is in electrical contact with holder 10 by rivet 25. A wire 26 extends from signal device S to one end of battery holder 27. Finally, an electric wire 28 extends from the signal device S to the yoke 11 and provides a circuit through the yoke 11 to the bracket 12 and in turn the contact arm 18.

As shown in FIG. 6, the rod holder 10 is pivoted on the yoke 11 by insulated bearings 30 on rod 31 extending through the arms of the yoke 11 and held in position by nuts 32 threaded thereon.

Alternatively, the battery and battery holder 27 may be omitted and wires may extend from the rivet 25 and yoke 11 externally of the rod holder to a battery and thereby provide a circuit, in which case the bracket 12 must be connected to that circuit. When so used, a plurality of rod holders can be connected in parallel to a single battery.

Although not forming a part of the invention, the bracket 12 is adjustably mounted on the plate 14 by a pin 33 on the plate extending upwardly through an opening in the horizontal portion 13 of the bracket. The horizontal portion 13 includes a downwardly extending projection 34 that is adapted to engage one of a plurality of circumferentially spaced recesses 35 in the plate 14 to hole the bracket 12 in angularly adjusted position with respect to a vertical axis. A hitch pin is provided through the upstanding pin to retain the bracket in adjusted position. A cord may be provided between the cross shaft of the bracket to retain the hitch pin against loss. The plate 14 is obviously adapted to be mounted on a surface by screws.

In operation, the rod holder is adjusted on the base plate at any desired angle. The fishing line and lure are then cast or let out any desired distance and the desired reel drag is set. The safety guard 36 which is in the form of a plastic strip fixed to the rod holder 10 and normally interposed between the contacts 15,16 and the end of the contact arm when the rod holder is not in use, is lifted away. The nut 24 is then adjusted to obtain the sensitivity desired.

If the fishing is being conducted by trolling or still fishing, when the line tension is increased, the contact arm 18 will engage the contact 15 energizing the signal device. When used in downrigger fishing, a definite tension is applied by the line. This would normally engage the contact 15. However, the tension control knob 24 is adjusted so that the alarm is not energized when the normal downrigger tension is applied. In such a condition, when the tension is relieved or decreased, the signal device will become energized when contact arm 18 engages contact 16.

Although the signal device has been described as forming part of the holder, it should be understood that it can also be placed externally of the holder with appropriate wiring thereto.

A plurality of fishing rod holding devices 10 may be connected in a single system as shown in FIG. 8. Devices 10 are connected in parallel through an enabling switch to a single alarm or signal device 27a energized from a single battery B. A circuit through any of the devices 10 will energize the alarm 27a.

It can thus be seen that there has been provided a fishing rod holder with a signaling device that will function to provide a signal whenever the tension on the line is increased beyond a predetermined amount or decreased beyond a predetermined amount depending upon the conditions of fishing and that this predetermined amount can be adjusted in use.

I claim:

1. A fishing rod holder comprising
a bracket,
a rod holding means including a rod holding member,
means for pivotally supporting said rod holding means on said bracket for movement about a generally horizontal axis,
a pair of spaced electrical contacts on said rod holding member,
a contact arm forming a third contact adapted to be normally engaged by said rod holding member at a point intermediate said spaced first and second contacts,
means yieldingly mounting said contact arm on said bracket,
a signal device,
and means providing a circuit between either of said pair of contacts and said signal device such that when the rod holding member is moved in one direction or another relative to the bracket a predetermined distance, a circuit is completed through said contact arm to energize said signal means.

2. The fishing rod holder set forth in claim 1 including means for varying the yielding force on said contact arm.

3. The fishing rod holder set forth in claim 1 including spaced openings in said contact arm, a stud extending from said bracket through one of said openings, a bolt extending from said bracket through the other of said openings, said yielding means including a spring on said bolt, and a nut threaded on said bolt and yieldingly urging said contact arm toward said bracket.

4. The fishing rod holder set forth in claim 1 wherein said rod holding means comprises means for supporting said signal device.

5. The fishing rod holder set forth in claim 4 wherein said rod holding means includes means for supporting the battery.

6. The fishing rod holder set forth in claim 1 wherein said means defining an electrical circuit comprises said holding member being made of electrically conductive material, said signal device being mounted for electrical contact with said holding means, a lead extending from said signal device to a power source, a lead extending in series from said power source to said bracket, said bracket and said tensioning arm being made of electrical conductive material.

7. The fishing rod holder set forth in claim 1 including means mounted on said rod holding member and adapted to be interposed between said contact arm and said first and second contacts to prevent the signal means from being energized.

8. The fishing rod holder set forth in claim 7 wherein said last-mentioned means comprises a strip of plastic material fastened to said rod holding means and adapted to be moved into and out of relationship between the first and second contacts and the contact arm.

9. A fishing rod holder comprising
a bracket including a yoke,
a tubular rod holder,
means for pivotally supporting and electrically insulating said rod holding member on said yoke of said bracket for movement about a generally horizontal axis,
a pair of spaced electrical contacts on said rod holding member electrically insulated,
a contact arm forming a third contact adapted to be normally engaged by said rod holder at a point intermediate said spaced first and second contacts,
means yieldingly mounting said contact arm on said bracket,
a signal device,
and means providing a circuit between either of said pair of contacts and said signal device such that when the rod holder is moved in one direction or another relative to the bracket, a predetermined distance, a circuit is completed through said contact arm to energize said signal means.

10. The fishing rod holder set forth in claim 9 including means for varying the yielding force on said contact arm.

11. The fishing rod holder set forth in claim 9 including spaced openings in said contact arm, a stud extending from said bracket through one of said openings, a bolt extending from said bracket through the other of said openings, said yielding means including a spring on said bolt, and a nut threaded on said bolt and yieldingly urging said contact arm toward said bracket.

12. The fishing rod holder set forth in claim 9 wherein said rod holder comprises means for supporting said signal device.

13. The fishing rod holder set forth in claim 10 wherein said rod holder includes means for supporting the battery.

14. The fishing rod holder set forth in claim 9 wherein said means defining an electrical circuit comprises said holder being made of electrically conductive material, said first and second contacts being mounted for electrical contact on said holder and providing a circuit to said signal device on said holder, a lead extending in series from said signal device to a power source, and a lead extending from said bracket to said power source, said bracket and said contact arm being made of electrical conductive material.

15. The fishing rod holder set forth in claim 9 including means mounted on said rod holder and adapted to be interposed between said contact arm and said first and second contacts to prevent the signal means from being energized.

16. The fishing rod holder set forth in claim 15 wherein said last-mentioned means comprises a strip of plastic material fastened to said rod holding member and adapted to be moved into and out of relationship between the first and second contacts and the contact arm.

* * * * *